June 29, 1926.
H. E. BRUNNER
1,590,181
ANTIFRICTION BEARING MOUNTING
Filed Feb. 27, 1923
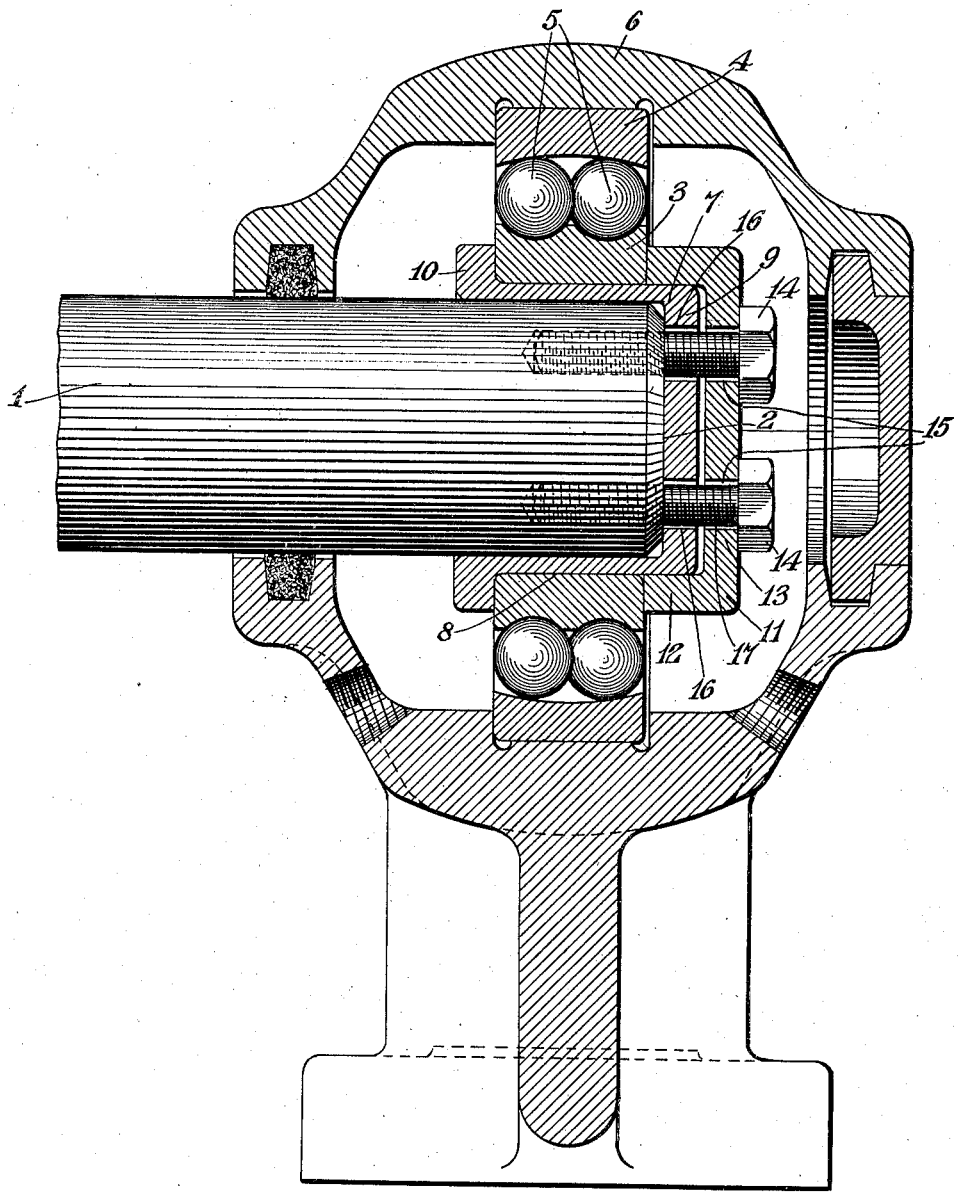
Inventor
Harold E. Brunner.
By his Attorneys
Rogers, Kennedy Campbell Patented June 29, 1926.

1,590,181

UNITED STATES PATENT OFFICE.

HAROLD E. BRUNNER, OF LARCHMONT, NEW YORK, ASSIGNOR TO THE SKAYEF BALL BEARING COMPANY, A CORPORATION OF CONNECTICUT.

ANTIFRICTION-BEARING MOUNTING.

Application filed February 27, 1923. Serial No. 621,511.

This invention relates to anti-friction bearing shaft mountings, and has for an object to provide means for fixedly mounting a ball or other anti-friction bearing upon the end of a plain shaft. A device constructed in accordance with my invention is particularly useful in mounting a bearing on a shaft which has not been provided with the usual shoulder or abutment for receiving the side face of the inner ring of the bearing nor with a screw threaded extension for receiving a nut for clamping the ring against such abutment.

In the drawing accompanying this application one practicable form of my invention is illustrated. The drawing, showing the parts principally in longitudinal section, represents the end of a shaft and a housing or support for a bearing together with a bearing and the parts making up my improved mounting.

The shaft, 1, as illustrated, has a plain cylindrical surface, and a flat radial end face, 2, upon the end of which shaft there is mounted an anti-friction bearing, shown as a ball bearing having an inner ring, 3, an outer ring, 4, and two rows of balls, 5, located therebetween. The outer ring is mounted in a casing, 6, this being shown in the form of a standard.

In mounting bearings upon the end of a shaft, when it is desired to have the bearing fast upon the shaft for various reasons, among which is that of stabilizing or locating the shaft axially, it is the present practice to provide a shaft of much larger diameter than the diameter of the bore of the bearing and turn down a bearing seat for the inner ring, in so doing a shoulder is formed for the inner lateral face of such ring. The end of the shaft beyond or outwardly of the bearing ring seat, is, according to such practice, screw threaded to take a nut for clamping the inner ring against the shoulder formed inwardly of the bearing seat. In other instances a taper is given the bore of the inner ring, and a split taper sleeve, known as an adapter sleeve, mounted upon the end of the shaft in cases found not feasible to provide the shaft with a shouldered seat. In one instance a specially constructed shaft is required, in the other a specially constructed bearing.

My improvement in mountings is intended to enable the use of a stock or regular bearing on a plain shaft, and whereby the bearing is absolutely and definitely located at a predetermined distance from the end of the shaft. To accomplish this I provide a thimble or ferrule, 7, having a portion constructed and adapted to embrace the end of a shaft and constituting a seat portion, 8, for the inner ring, 3, of the anti-friction bearing. The closed end, 9, of the ferrule, or if desired a flange which may be provided in certain instances, is for engaging the end face, 2, of the shaft and locating or positioning the ferrule longitudinally thereon. There is also shown a flange or abutment, 10, inwardly of the bearing seat, 8, adapted for engaging the side face of the inner ring, 3, and positively positioning the same at a predetermined distance from the plane of the end face, 2, of the shaft. In most instances the ferrule and the inner ring of the bearing have a press fit upon the end of the shaft. For the purpose of clamping the ring 3, against the abutment, 10, and the limiting abutment, 9, of the ferrule against the end face, 2, of the shaft, there is shown a cup shaped clamping member, 11, having a portion, 12, constructed and adapted to embrace the ferrule outwardly of the bearing seat and engage the outer face of the ring, 3, and a bottom portion, or flange if preferred, 13, adapted to overlie the closed end, 9, of the ferrule. In one aspect the fact that the portion, 13, of the cup overlies the portion, 9, of the ferrule is a mere incident, because the main function of this part of the clamping member is to be disposed outwardly or beyond the end of the shaft whereby it may be engaged by suitable means for drawing it toward the shaft and forcing the part, 12, inwardly of the shaft and against the side face of the ring, 3. In the present illustration two cap screws, 14, are employed for this purpose. These cap screws are shown passing through suitable holes, 15, in the bottom portion of the clamping member and through suitable holes, 16, in the bottom portion of the ferrule. The closeness or looseness of the fit of the shank portion, 17, of the screws in these holes, 15 and 16, is determined among other things by the extent to which such screws are intended to prevent the rotation of the ferrule and the clamping member, or either of them, about the shaft.

In some instances the tightness of the fit of the parts one upon the other and the extent to which the parts are clamped together will obviate any necessity of utilizing the screws to prevent such rotation. In other instances it may be found highly desirable to permit a limited amount of relative rotation, and in other instances to make the parts so fitted together that the screws act as pins or studs for completely preventing this rotation or relative angular movement.

I claim as my invention:

1. A ferrule or thimble having a portion constructed and adapted to embrace the end of a shaft with a sliding fit and constituting a seat for the inner ring of an anti-friction bearing, said ferrule or thimble and said shaft being each of substantially the same diameter throughout, and there being a flange or abutment on said ferrule or thimble inwardly of the said bearing seat and a portion for engaging the end face of the shaft.

2. A ferrule or thimble constructed and adapted to fit over the end of a shaft and having a bearing seat and a portion for engaging the end face of the shaft, there being an outwardly directed flange or abutment at the other end for engaging the side of the inner ring of an anti-friction bearing mounted on such seat, and a clamping member of substantially the same diameter throughout constructed and adapted to embrace the ferrule outwardly of the said bearing seat with a sliding fit and to engage the other side of the bearing ring seated thereon.

3. A ferrule or thimble constructed and adapted to fit over the end of a shaft and having a bearing seat and a portion for engaging the end face of the shaft, there being an outwardly directed flange or abutment at the other end for engaging the side of the inner ring of an anti-friction bearing mounted on such seat, and a clamping member constructed and adapted to embrace the ferrule outwardly of the said bearing seat to engage the other side of the bearing ring seated thereon, and means for applying pressure to the said clamping member in a direction inwardly of the shaft.

4. A bearing mounting comprising a ferrule or thimble constructed and adapted to embrace the end of a shaft, such ferrule having a closed end provided with a fastener opening and a flange at the other end constituting an abutment for an anti-friction bearing ring, and a clamping member comprising a cup having a portion for embracing the ferrule outwardly of the bearing ring seat, the closed end of the cup being adapted to overly the closed end of the ferrule and being provided with an opening registering with an opening in the ferrule.

5. A mounting comprising a shaft end having a radially disposed face, a ferrule adapted to embrace the said shaft end with its closed end abutting the said radial face the edge portion of the ferrule being provided with a flange constituting an abutment for an anti-friction bearing ring, an anti-friction bearing having its inner ring mounted upon the said ferrule and engaging the said abutment, a clamping member comprising a cup having a portion embracing the ferrule outwardly of the bearing ring and engaging the outer face of the ring, the end of the shaft being provided with tapped holes, and cap screws passing through the bottom of the cup of the clamping member and the closed end of the ferrule, there normally being clearance between such parts, the screws being adapted to force the clamping member against the inner ring of the bearing and this against the abutment at the inner end of the ferrule.

6. A ferrule or thimble having a portion constructed and adapted to embrace the end of a shaft with a sliding fit and constituting a seat for the inner ring of an anti-friction bearing, said ferrule or thimble and said shaft being each of substantially the same diameter throughout, there being a flange or abutment on said ferrule or thimble inwardly of the bearing seat, and a portion for engaging the radial end face of the shaft, and a clamping member mounted on the ferrule outwardly of such seat, and adapted to engage the bearing ring.

In testimony whereof, I have affixed my signature hereto.

HAROLD E. BRUNNER.